(12) United States Patent
Remmert (10) Patent No.: US 7,864,509 B1
(45) Date of Patent: Jan. 4, 2011

(54) CONVERTIBLE ELECTRICAL DISTRIBUTION PANEL

(75) Inventor: Scot E. Remmert, Mt. Pulaski, IL (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 12/491,536

(22) Filed: Jun. 25, 2009

(51) Int. Cl.
*H02B 1/04* (2006.01)

(52) U.S. Cl. ............... 361/631; 361/634; 361/641; 361/643

(58) Field of Classification Search .............. None
See application file for complete search history.

(56) References Cited

U.S. PATENT DOCUMENTS

| | | | |
|---|---|---|---|
| 4,398,097 A * | 8/1983 | Schell et al. ............ 307/64 |
| 4,747,061 A | 5/1988 | Lagree et al. |
| 4,894,796 A | 1/1990 | Engel et al. |
| 5,070,429 A * | 12/1991 | Skirpan ............ 361/644 |
| 5,210,685 A | 5/1993 | Rosa |
| 5,397,868 A | 3/1995 | Smith et al. |
| 6,100,604 A | 8/2000 | Morroni et al. |
| 6,181,028 B1 | 1/2001 | Kern et al. |
| 6,380,862 B1 * | 4/2002 | Karim et al. ............ 340/635 |
| 6,791,211 B1 * | 9/2004 | Flegel ............ 307/113 |
| 6,849,967 B2 | 2/2005 | Lathrop et al. |
| 6,980,911 B2 | 12/2005 | Eaton et al. |
| 6,995,327 B1 | 2/2006 | Shepstone et al. |
| 7,005,760 B2 | 2/2006 | Eaton et al. |
| 7,157,811 B2 | 1/2007 | Eaton et al. |
| 7,209,343 B2 * | 4/2007 | Remmert et al. ............ 361/634 |
| 7,239,045 B2 | 7/2007 | Lathrop et al. |
| 7,259,481 B2 | 8/2007 | Eaton et al. |
| 7,307,823 B2 | 12/2007 | Dabrowski et al. |
| 7,336,003 B2 | 2/2008 | Lathrop et al. |
| 7,418,314 B2 * | 8/2008 | Rasmussen et al. ......... 700/286 |
| 7,599,171 B1 * | 10/2009 | Remmert ............ 361/631 |
| 7,616,432 B2 * | 11/2009 | Luebke et al. ............ 361/631 |
| 7,688,573 B2 * | 3/2010 | Ranta ............ 361/645 |
| 2006/0028069 A1 | 2/2006 | Loucks et al. |
| 2008/0088182 A1 | 4/2008 | Lathrop et al. |
| 2008/0258558 A1 | 10/2008 | Lathrop et al. |
| 2009/0046415 A1 * | 2/2009 | Rasmussen et al. ......... 361/644 |

OTHER PUBLICATIONS

Generac Power Systems, Inc. "Genready Load Center and Transfer Switch", 2009, 7 pp.

* cited by examiner

*Primary Examiner*—Boris L Chervinsky
(74) *Attorney, Agent, or Firm*—Martin J. Moran (57) ABSTRACT

An electrical distribution panel includes an enclosure, a first power input, a first circuit interrupter including a first terminal electrically connected to the first power input and a second terminal, a first bus electrically connected to the second terminal, a plurality of second circuit interrupters powered from the first bus, a second bus electrically connectable to the first bus through one of the second circuit interrupters, and a number of third circuit interrupters powered from the second bus. The first bus and a number of the second circuit interrupters power a number of first loads. The second bus and the number of third circuit interrupters power a number of different second loads. The electrical distribution panel is converted for operation with a second power input to power the second bus. The second power input receives power from at least one of a separately derived system, and a portable generator.

17 Claims, 6 Drawing Sheets

CONVERTIBLE ELECTRICAL DISTRIBUTION PANEL

BACKGROUND

1. Field

The disclosed concept pertains generally to electrical distribution panels and, more particularly, to electrical distribution panels being configured or being configurable to accommodate non-critical loads and critical loads supplied with power from a second power source in response to power from a first power source becoming unacceptable.

2. Backgound Information

Electrical distribution panels, such as load centers, incorporate a plurality of circuit breakers and provide a safe and controllable distribution of electric power. Such load centers have become a common feature in both residential and commercial applications. Increasingly, such load centers are utilized in installations that incorporate, for example, an electric generator as a second power source in the event that a utility service serving as a first power source fails or becomes unacceptable.

With technological progress resulting in ever more uses for electricity, the amount of electrical power required for both residential and commercial applications has steadily increased, and this had lead to increased demand for relatively larger electric generators. Unfortunately, relatively larger electric generators present various disadvantages over relatively smaller electric generators. While smaller electric generators are typically air cooled, larger electric generators typically require a liquid cooling system with a circulation pump and radiator, thereby adding to both the costs and complexities of operating and maintaining a larger generator in comparison to a smaller generator. Larger generators also require relatively larger quantities of maintenance fluids, including lubrication oil and coolant liquid.

A known proposal for either new construction or the retrofit of existing installations involves the addition of a separate load center panel for critical circuits. This separate load center panel receives a backup power source and, also, manually switches between a utility power source and the backup power source. This can be utilized in installations that incorporate the backup power source, such as an electric generator, in the event that the utility power source becomes unacceptable (e.g., without limitation, fails; becomes unreliable; becomes unavailable). This can provide, for instance, reliable electric power for doctor's offices away from hospitals, home-based businesses and home-based chronic patient care support. For existing installations, this requires that the critical circuits be moved (e.g., rewired) from a first load center to the separate load center panel. However, it requires significant time and effort to rewire a load center in order to electrically connect a backup power source, such as an electric generator or other auxiliary power unit (APU) (e.g., a device whose purpose is to provide electrical energy), to critical circuits in, for example, residential and relatively smaller scale commercial structures.

Transfer switches are well known in the art. See, for example, U.S. Pat. Nos. 6,181,028; 5,397,868; 5,210,685; 4,894,796; and 4,747,061. Transfer switches operate, for example, to transfer a power consuming load from a circuit with a normal power supply to a circuit with an auxiliary power supply. Applications for transfer switches include stand-by applications, among others, in which the auxiliary power supply stands-by if the normal power supply should fail. Facilities having a critical requirement for continuous electric power, such as hospitals, certain plant processes, computer installations, and the like, have a standby power source, often a diesel generator. A transfer switch controls electrical connection of the utility lines and the generator to the facility load buses. In many installations, the transfer switch automatically starts the generator and electrically connects it to the load bus upon loss of utility power, and electrically reconnects the utility power source to the load bus if utility power is reestablished.

Another known proposal employs a single interlock between a main circuit breaker and a manual transfer switch. In response to loss of utility power, the user must first manually turn off any non-critical circuits, turn off the main circuit breaker, and then turn on the transfer switch. The manual sequence is reversed when utility power has returned.

Other known proposals provide mechanical interlocks between a main circuit breaker and a generator circuit breaker.

Further known proposals require that the entire load be switched from the utility power source to the generator power source. In other words, the loads are not separated into critical loads and non-critical loads.

U.S. patent application Ser. No. 12/043,514 discloses a first bus powered from a first circuit breaker and a first power input, a second bus, an automatic transfer switch including a first input electrically connected to the first bus, a second input electrically connected to a second power input, and an output electrically connected to the second bus, and a number of pairs of circuit breakers. The number of pairs of circuit breakers include a second circuit breaker powered from the first bus, a third circuit breaker powered from the second bus, a power output powered from the second and third circuit breakers, and an interlock cooperating with the second and third circuit breakers and structured to prevent both of the second and third circuit breakers from being closed at the same time.

It is known to provide a load center that can accept an automatic transfer switch.

NEC 2008, Optional Standby Systems, provides in Section 702.5(2)(a)-(b) that where automatic transfer equipment is used, an optional standby system shall comply with either: (a) the standby source shall be capable of supplying the full load that is transferred by the automatic transfer equipment, or (b) where a system is employed that will automatically manage the electrically connected load, the standby source shall have a capacity sufficient to supply the maximum load that will be electrically connected by the load management system. Hence, for an automatic transfer switch, the standby system must be able to handle the entire load that is transferred.

A suitable manual switch/interlock arrangement is used with a portable generator. This is because Article 702 of the NEC requires that a load center or panelboard cannot be simultaneously energized from two different power sources. Hence, the user must turn off a utility source input before turning on a generator source input. For example, a mechanical interlock prevents accidently backfeeding onto the utility source input since this could, otherwise, cause equipment failure, fire, or possible death due unexpected energized utility power lines. Also, portable generators are not setup to automatically start up and transfer power, which must be done manually.

In a "separately derived" system, the neutral and ground are electrically bonded together by a system bonding jumper at the generator. This neutral and ground are typically protected by a ground fault circuit interrupter (GFCI) at the generator. Failure to install the system bonding jumper correctly can result in nuisance tripping of this GFCI.

In a "non-separately derived" system, the neutral and ground are not electrically bonded at the generator. Instead, the neutral assemblies for the utility source and the generator source are electrically connected together at the load center. Failure to properly make that electrical connection could lead to equipment failure, fire, or possible death due to a floating neutral condition.

U.S. patent application Ser. No. 12/172,504 discloses an electrical distribution panel including an enclosure comprising a first compartment and a separate second compartment, a first power input, a first circuit interrupter including a first terminal electrically connected to the first power input and a second terminal, a first bus electrically connected to the second terminal of the first circuit interrupter, a plurality of second circuit interrupters powered from the first bus, a second bus electrically connected to the first bus through one of the second circuit interrupters, and a number of third circuit interrupters powered from the second bus. The first bus and the number of second circuit interrupters are structured to power only a number of first loads. The second bus and the number of third circuit interrupters are structured to power only a number of second loads. The second compartment is structured to receive an automatic transfer switch including a first input electrically connectable to the first bus, a second input electrically connectable to a second power input, and an output electrically connectable to the second bus. The automatic transfer switch is structured to selectively electrically connect one of the first and second inputs of the automatic transfer switch to the output of the automatic transfer switch. This enables a user, such as a home owner, to install an electrical distribution panel, such as, a load center panel, at the time of construction and use that load center panel as a conventional load center until, at a later date, they can afford to purchase and install a second power source (e.g., without limitation, a generator) and an automatic transfer switch. Hence, the electrical distribution panel provides a load center that is ready to receive an automatic transfer switch and operate with an automatic, standby generator of a non-separately derived power system. An automatic transfer switch kit includes an interior assembly having an automatic transfer switch and a corresponding wire harness.

Figure 1:
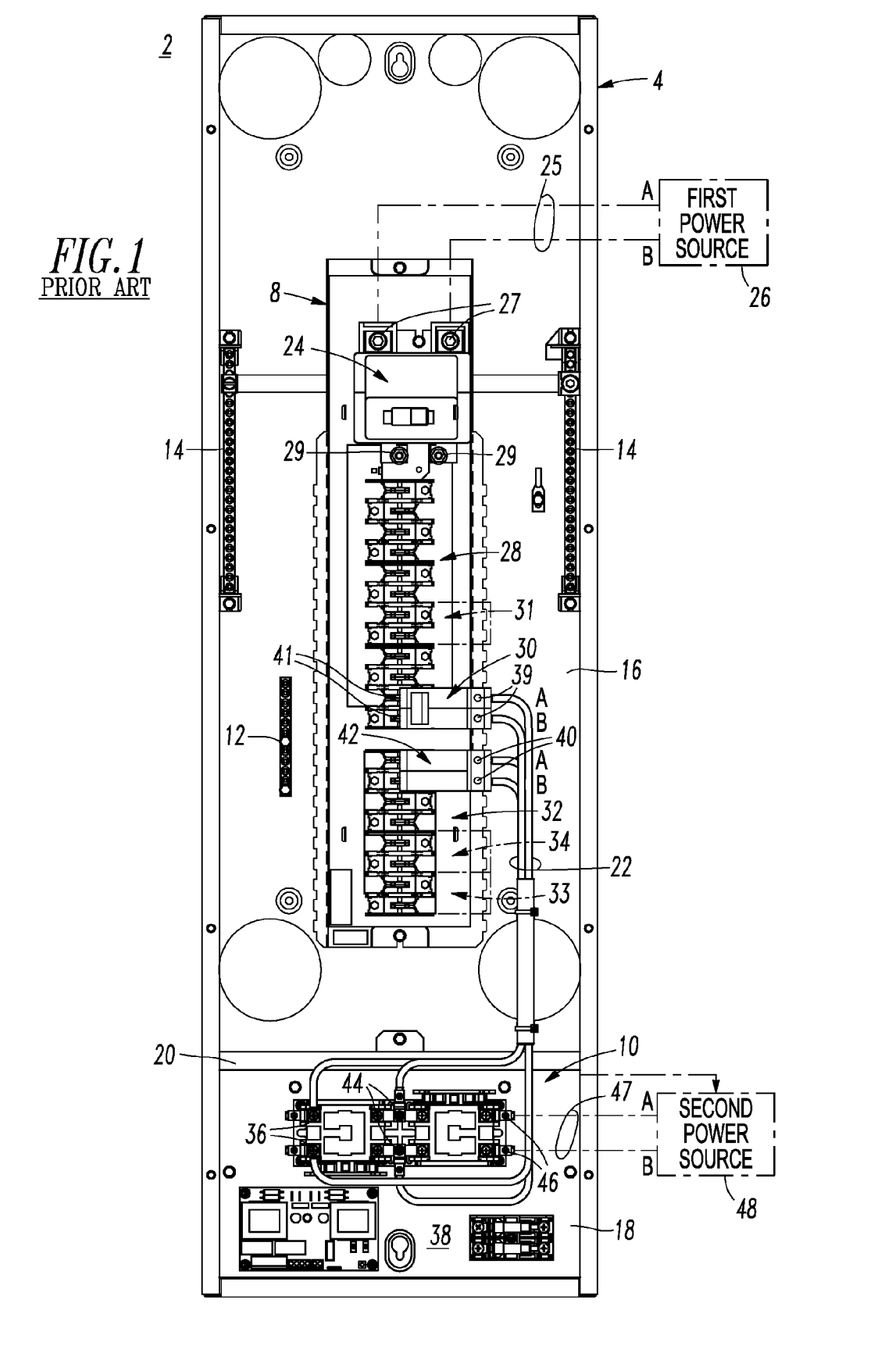
FIGS. 1 and 2 are vertical elevation views of load centers with the front cover removed to show internal structures.

Referring to FIG. 1, a load center 2 includes an enclosure assembly 4, a trim assembly (not shown), a first interior assembly 8 and a second interior assembly 10. As is conventional, the load center 2 also includes a ground bar assembly 12 and a number of neutral bar assemblies 14. The load center 2 is divided into a first or upper (with respect to FIG. 1) section 16 containing the first interior assembly 8 and a second or lower (with respect to FIG. 1) section 18 containing the second interior assembly 10. A barrier 20 preferably separates the first section 16 from the second section 18. For example, the barrier 20 physically separates the sections 16,18 for UL purposes. The section 18 preferably meets panelboard standards under UL 67, and transfer switch standards under UL 1008. A wire harness 22 electrically connects the first interior assembly 8 and the second interior assembly 10 as will be described.

As is conventional, the load center 2 includes a main circuit breaker 24 (e.g., without limitation, two poles, 200 A). The main circuit breaker 24 provides power from a first power input 25 for a first power source (e.g., without limitation, utility; primary) 26 (shown in phantom line drawing) to a first bus 28 (e.g., without limitation, 120 VAC and/or 240 VAC) of the first interior assembly 8, which first bus 28 includes a number of circuit breakers of which only example circuit breaker 30 (e.g., without limitation, two pole, 50 A) and circuit breaker 31 (shown in phantom line drawing) are shown. Although two-pole circuit breakers are shown, the load center 2 can include circuit interrupters having any suitable number of poles. The main circuit breaker 24 includes a number of first or line terminals 27 electrically connected to the first power input 25 and a number of second or load terminals 29. The first bus 28 is electrically connected to the number of second or load terminals 29 of the main circuit breaker 24. The circuit breaker 30 includes a number of line terminals 41 (e.g., without limitation, two line terminals are shown) electrically connected to the first bus 28.

The first interior assembly 8 also includes a separate second bus 32 (e.g., without limitation, 120 VAC and/or 240 VAC), which second bus 32 includes a number of circuit breakers of which only circuit breakers 33,34 (shown in phantom line drawing) are shown. As will be explained, only circuit breakers, such as 33,34, of the separate second bus 32 are employed to power critical loads. Also, only circuit breakers, such as 31, of the first bus 28 are employed to power non-critical loads. The circuit breakers 30,31 operate independently from (e.g., without limitation, do not require any interlock therebetween) the circuit breakers 33,34.

The wire harness 22 electrically connects the load terminals 39 of the circuit breaker 30 to first input terminals 36 of an automatic transfer switch (ATS) 38 of the second interior assembly 10. The wire harness 22 also electrically connects the input terminals 40 of a sub-feed lug block 42 to the output terminals 44 of the ATS 38. The sub-feed lug block 42, thus, electrically connects the output terminals 44 of the ATS 38 to the second bus 32.

As is conventional, the ATS 38 includes second input terminals 46 for receiving power from a second power input 47 for a second power source 48 (e.g., without limitation, backup; a generator; an auxiliary power unit; an uninterruptible power source).

During normal operation, the critical circuits powered from the second bus 32 are energized by the ATS 38 with power from the first power source 26. As is conventional, the non-critical circuits powered from the first bus 28 are always energized by power, if available, from the first power source 26. When the power from the first power source 26 is interrupted, the ATS 38 recognizes that loss of power, automatically starts, for example, the generator 48, and energizes only the critical circuits powered from the second bus 32 with power from the generator 48 through the output terminals 44 of the ATS 38 and through the sub-feed lug block 42.

Figure 2:
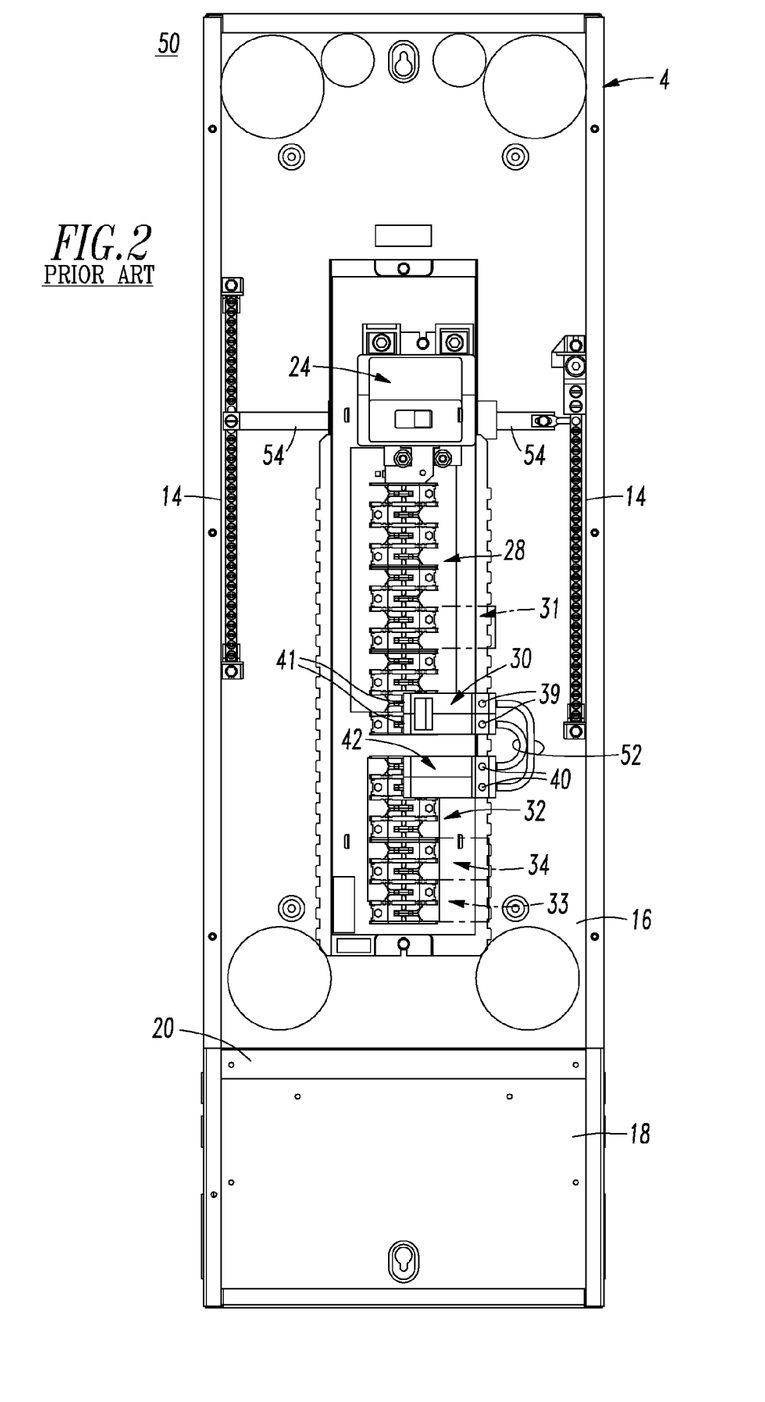

Referring to FIG. 2, another load center 50 is shown. The load center 50 is similar to the load center 2 of FIG. 1, except that the second interior assembly 10 including the ATS 38 and the wire harness 22 are not included. Instead, in FIG. 2, the branch mounted circuit breaker 30 (e.g., without limitation, CH250 marketed by Eaton Electrical, Inc. of Pittsburgh, Pa.) is electrically connected by jumper assembly 52 to the sub-feed lug block 42 (e.g., without limitation, CHSF2125 marketed by Eaton Electrical, Inc. of Pittsburgh, Pa.) to energize, when the circuit breaker 30 is closed, a number of critical circuits powered from the second bus 32 of the "split bus" (i.e., first bus 28 is electrically split apart from second bus 32) interior. Other non-critical circuits are terminated as part of the first bus 28 of the "split bus" interior. The jumper assembly 52 electrically connects the load terminals 39 of the circuit breaker 30 to the input terminals 40 of the sub-feed lug block 42. The jumper assembly 52 includes jumpers or wires (conductors) that supply power from the branch mounted circuit breaker 30 to the sub-feed lug block 42. For example, these jumpers or wires electrically connect the A and B legs of the first bus 28 (see, for example, the load terminals 39 of the circuit breaker 30) to the corresponding A and B legs (see, for example, the input terminals 40 of the sub-feed lug block 42) of the second bus 32.

There is room for improvement in electrical distribution panels.

SUMMARY

There remains a need for an electrical distribution panel, such as, for example and without limitation, a load center panel including a "split power bus" structure that is capable of operation with a portable generator (i.e., manual or non-automatic generator) and/or that can be configured as a "separately derived" system.

There also remains a need for such an electrical distribution panel that includes a mechanical interlock for utility and generator circuit breakers of a separate, second bus.

There further remains a need for such an electrical distribution panel that includes an additional neutral assembly, such that it can accommodate a "separately derived" system.

These needs and others are met by embodiments of the disclosed concept, which provide an electrical distribution panel structured to be converted for operation with a second power input to power a second bus, wherein the second power input is structured to receive power from at least one of: (i) a separately derived system; and (ii) a portable generator.

In accordance with one aspect of the disclosed concept, an electrical distribution panel comprises: an enclosure; a first power input; a first circuit interrupter including a first terminal electrically connected to the first power input and a second terminal; a first bus electrically connected to the second terminal of the first circuit interrupter; a plurality of second circuit interrupters powered from the first bus; a second bus electrically connectable to the first bus through one of the plurality of second circuit interrupters; and a number of third circuit interrupters powered from the second bus, wherein the first bus and a number of the plurality of second circuit interrupters are structured to power a number of first loads, wherein the second bus and the number of third circuit interrupters are structured to power a number of second loads, which are different than the number of first loads, wherein the number of the plurality of second circuit interrupters operate independently from the number of third circuit interrupters, wherein the electrical distribution panel is structured to be converted for operation with a second power input to power the second bus, and wherein the second power input is structured to receive power from at least one of: (i) a separately derived system; and (ii) a portable generator.

The electrical distribution panel may be structured to be converted for operation with the separately derived system.

The enclosure may include a number of first neutral bar assemblies and a number of second neutral bar assemblies, the number of first neutral bar assemblies and the number of second neutral bar assemblies being electrically connected together by a field-removable jumper.

The second bus may be structured to receive a first circuit breaker including a plurality of first poles with one of the first poles being structured to switch a first neutral, and a second circuit breaker including a plurality of second poles with one of the second poles being structured to switch a second neutral. The first neutral may be electrically connected to the number of first neutral bar assemblies and may be operatively associated with the first bus and the first power input. The second neutral may be operatively associated with the second power input. After the number of first neutral bar assemblies and the number of second neutral bar assemblies are electrically isolated by removing the field-removable jumper, one of the first circuit breaker and the second circuit breaker may switch one of the first neutral and the second neutral, respectively, to the number of second neutral bar assemblies.

The electrical distribution panel may be structured to be converted for operation with the portable generator.

The electrical distribution panel may be further structured to be converted for operation with the separately derived system.

The second bus may be structured to receive a first circuit breaker and a second circuit breaker; the first circuit breaker may be structured to selectively receive power from the portable generator; and the second circuit breaker may be structured to selectively receive power from the one of the plurality of second circuit interrupters powered from the first bus.

The enclosure may be structured to receive a trim assembly including a mechanical interlock structured to prevent both of the first circuit breaker and the second circuit breaker from being simultaneously closed.

The second bus may be structured to receive a fourth circuit interrupter and a fifth circuit interrupter; the fourth circuit interrupter may be structured to selectively receive power from the portable generator; the fifth circuit interrupter may be structured to selectively receive power from the one of the plurality of second circuit interrupters powered from the first bus; and the enclosure may be structured to receive a trim assembly including a mechanical interlock structured to prevent both of the fourth circuit interrupter and the fifth circuit interrupter from being simultaneously closed.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "electrical distribution panel" shall mean a load center or a panelboard (e.g., without limitation, a lighting and appliance panelboard; a Class CTL enclosed panelboard).

As employed herein, the term "critical load" shall mean a load that needs to be powered from one of a primary power source and an alternate backup power source during all times or during substantially all times. Non-limiting examples of critical loads include heating, ventilation and air conditioning (HVAC) loads; sump pumps; refrigerators; freezers; alarm systems; essential loads; medical equipment; and emergency loads.

As employed herein, the term "non-critical load" shall mean a load other than a critical load. Non-limiting examples of non-critical loads include non-essential loads; non-emergency loads; and not critical loads.

As employed herein, the term "convertible electrical distribution panel" shall mean an electrical distribution panel including a "split power bus" structure that can be converted to operate with a portable generator (i.e., manual or non-automatic generator) and/or that can be converted or configured as a "separately derived" system.

The disclosed concept is described in association with a load center accepting input from a number of power sources having two legs, although the disclosed concept is applicable to any electrical distribution panel having suitable current ratings for critical and non-critical loads and accepting input from power sources having any number of legs or phases.

FIG. 2 shows the ATS-ready load center 50 including the jumper assembly 52 between the first bus 28 and the separate second bus 32. Any suitable number of branch circuits can be employed with the first bus 28 and/or the separate second bus 32. In FIG. 2, all branch circuits, whether "critical" or "non-critical", use the same neutral, since all of the neutral bar assemblies 14 are directly electrically connected together by fixed, rigid, conductive strap 54 at the load center 50. Since the strap 54 is not field-removable, only a "non-separately derived" system is possible. Hence, a "separately derived" system cannot be provided.

Figure 3:
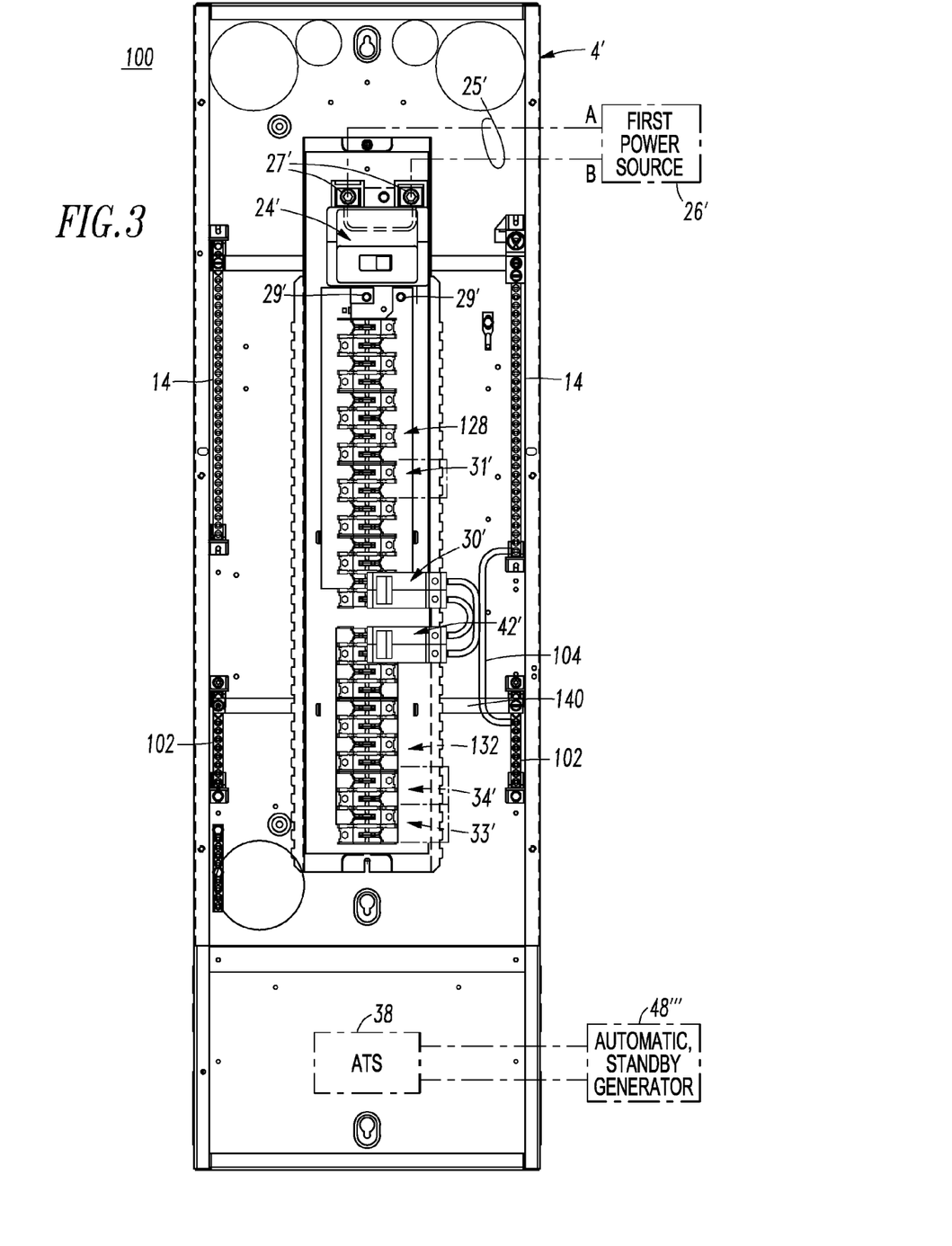
FIG. 3 is a vertical elevation view of a load center with the front cover removed to show internal structures in accordance with embodiments of the disclosed concept.
Figure 5:
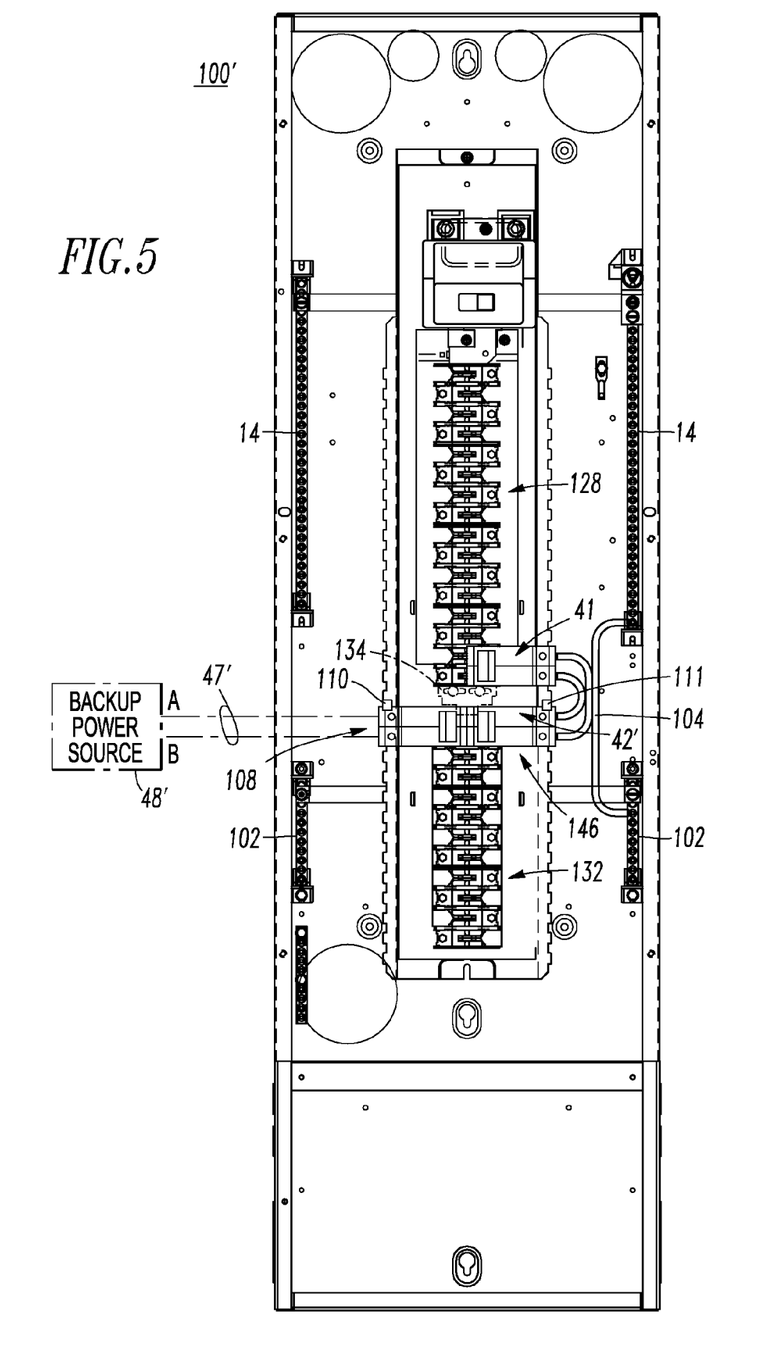
FIG. 5 is a vertical elevation view of a load center with the front cover removed to show internal structures of a non-separately derived system in accordance with embodiments of the disclosed concept.
Figure 6:
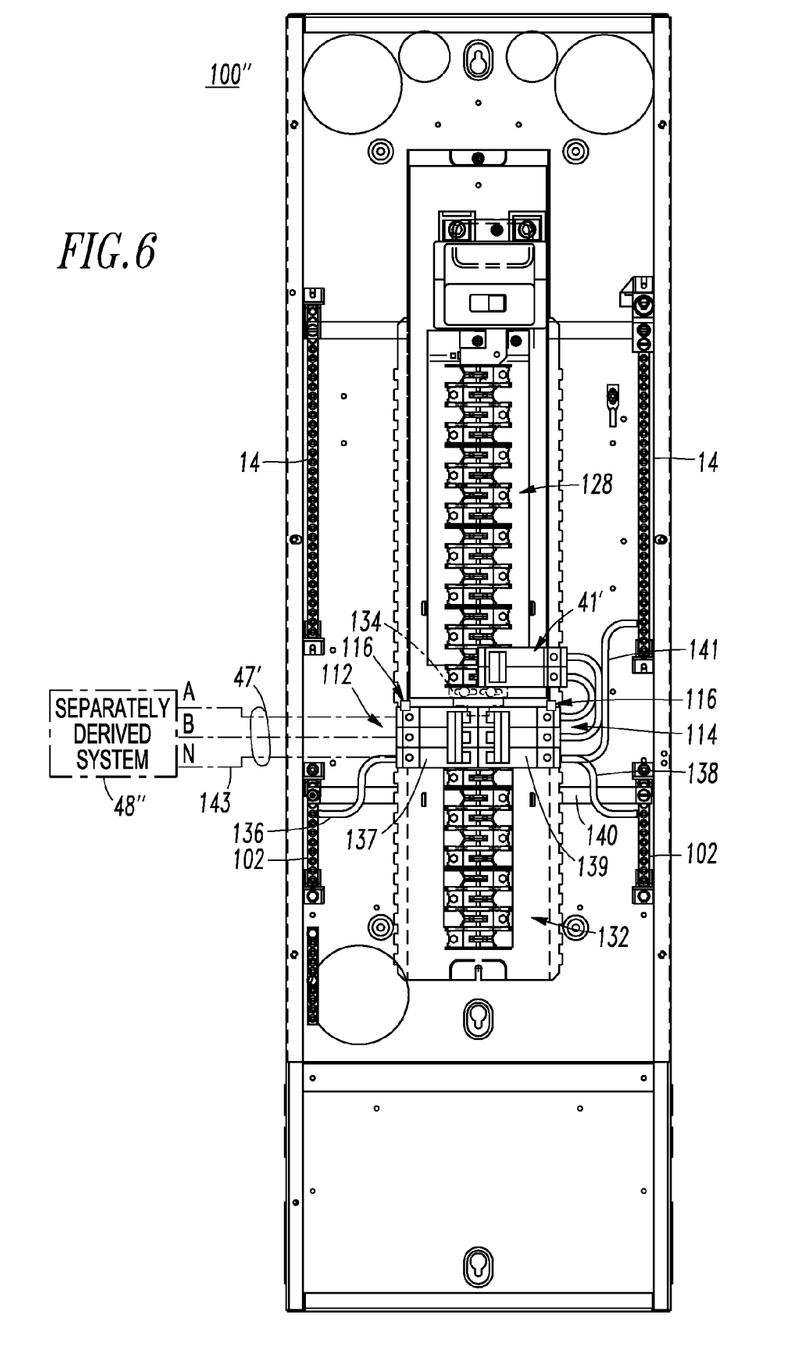
FIG. 6 is a vertical elevation view of a load center with the front cover removed to show internal structures of a separately derived system in accordance with embodiments of the disclosed concept.

FIG. 3 shows a load center 100, which is similar to the load center 50 of FIG. 2, except as will be described. Unlike the load center 50, the load center 100 includes a number (e.g., without limitation, two are shown; any suitable number) of neutral bar assemblies 102 and a field-removable jumper 104 electrically connected between one of the neutral bar assemblies 14 and one of the number of neutral bar assemblies 102. The neutral bar assemblies 102 are installed proximate the separate second bus 132. When installed, the field-removable jumper 104 permits a "non-separately derived" system to be provided as shown in FIG. 5. Conversely, when the field-removable jumper 104 is removed, this permits a "separately derived" system to be provided as shown in FIG. 6. Hence, the load center 100 can readily be converted to provide a "non-separately derived" system (FIG. 5) or a "separately derived" system (FIG. 6).

Somewhat similar to the load center 50, the load center 100 includes an enclosure 4', a first power input 25', a first circuit interrupter 24' including a first terminal 27' electrically connected to the first power input 25' and a second terminal 29'. A first bus 128 is electrically connected to the second terminal 29' of the first circuit interrupter 24'. A plurality of second circuit interrupters 30',31' are powered from the first bus 128. A second bus 132 is electrically connectable to the first bus 128 through the second circuit interrupter 30'. A number of third circuit interrupters 33',34' are powered from the second bus 132. The first bus 128 and a number of the second circuit interrupters 31' are structured to power a number of first loads. The second bus 132 and the number of third circuit interrupters 33',34' are structured to power a number of second loads, which are different than the number of first loads. The number of the second circuit interrupters 31' operate independently from the number of third circuit interrupters 33',34'.

Unlike the load center 50, the load center 100 is structured to be converted for operation with a second power input 47' which is structured to receive power from at least one of: (i) a separately derived system 48" (FIG. 6); and (ii) a portable generator 48' (FIG. 5). The separately derived system 48" (FIG. 6) can also be a portable generator.

Figure 4:
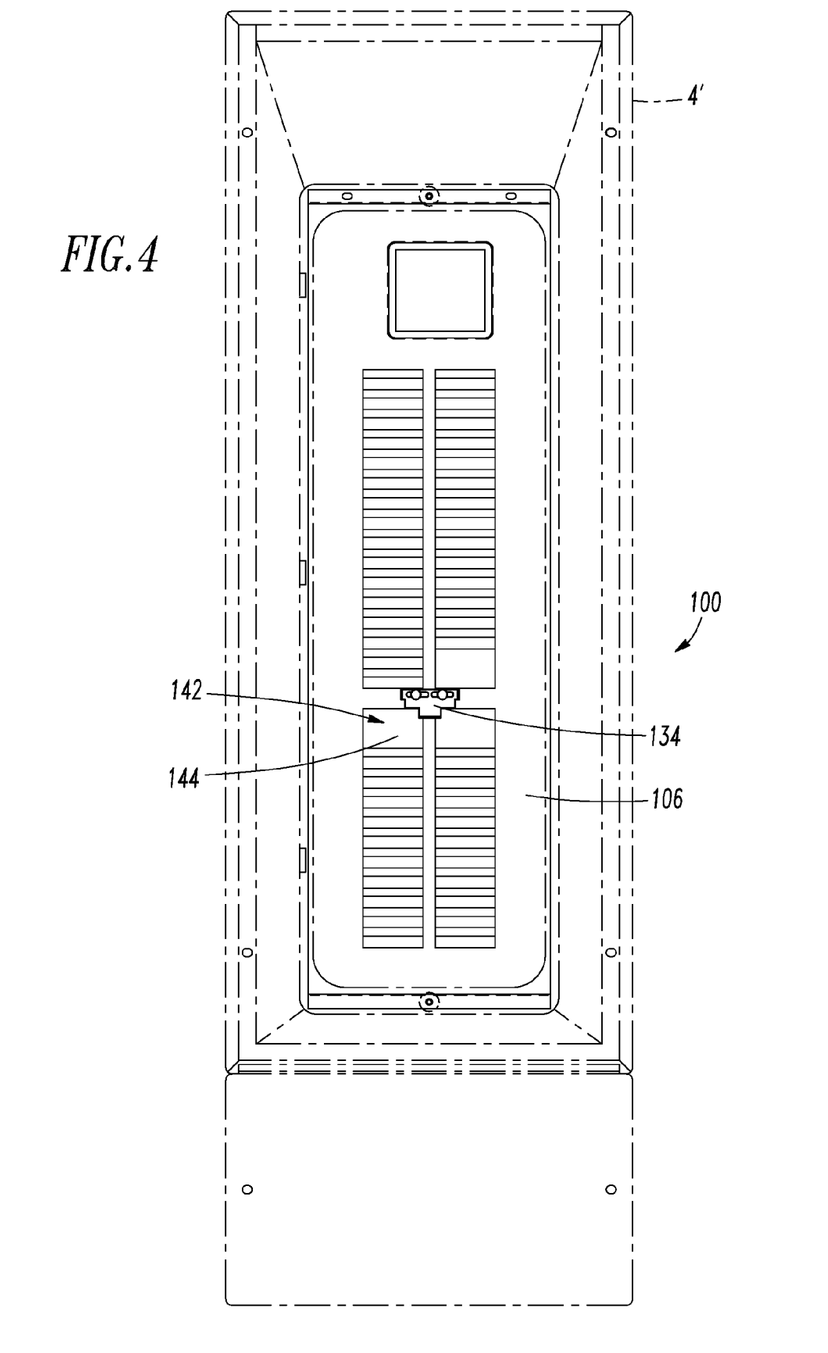
FIG. 4 is a vertical elevation view of the load center of FIG. 3 with the front cover installed.

FIG. 4 shows a trim assembly 106 for the load center 100 of FIG. 3.

A wide range of suitable conversion kits can be provided for the load center 100 depending upon user needs. Example conversion kits, which are discussed, below, in connection with Examples 1 to 5, are different from the automatic transfer switch kit of application Ser. No. 12/172,504.

Example 1

Referring to FIGS. 4 and 5, a first example conversion kit includes the trim assembly 106 of FIG. 4 along with a generator circuit breaker 108 (e.g., without limitation, two-pole; 30A; 50A; any suitable rating) and a hold down kit 110 for the generator circuit breaker 108. This conversion kit, when installed, provides the load center 100' of FIG. 5. The utility circuit breaker 42', in this example, is part of the load center 100 of FIG. 3. The second bus 132 is structured to receive circuit breakers 108,42'. The generator circuit breaker 108 is structured to selectively receive power from the portable generator 48', and the utility circuit breaker 42' is structured to selectively receive power from the circuit interrupter 41 powered from the first bus 128. The trim assembly 106 includes a mechanical interlock 134 structured to prevent both of the circuit breakers 108,42' from being simultaneously closed. In this example, the portable generator 48' is a non-separately derived system. The trim assembly 106 covers the enclosure 4' (shown in phantom line drawing in FIG. 4) of FIG. 3.

Example 2

In contrast to Example 1, the load center 100 of FIG. 3 is also structured to be converted for operation with the separately derived system 48" (FIG. 6). A second example conversion kit includes the trim assembly 106 of FIG. 4, two three-pole circuit breakers 112,114 and a hold down kit 116 including two hold downs for the two circuit breakers 112, 114. The utility circuit breaker 114 replaces the utility circuit breaker 42' of FIG. 3. This conversion kit, when installed, provides the load center 100" shown in FIG. 6. The three-pole circuit breakers 112,114 provide a switched neutral (e.g., each circuit breaker has a respective pigtail 136,138, rather than a stab (not shown), for the third switched-neutral pole 137,139, respectively) and are employed by the separately derived system 48". The generator circuit breaker 112 is structured to selectively receive power from an example portable generator, which is the separately derived system 48".

In this example, the second bus 132 is structured to receive the two three-pole circuit breakers 112,114 as shown in FIG. 6. One of the poles 139 of the utility circuit breaker 114 is structured to switch a first neutral 141 from the neutral bus bar 14. One of the poles 137 of the generator circuit breaker 112 is structured to switch a second neutral 143 from the portable generator 48". The first neutral 141 is electrically connected to the neutral bar assemblies 14 and is operatively associated with the first bus 128 and the first power input 25' (FIG. 3). The second neutral 143 is operatively associated with the second power input 47'. After the first neutral bar assemblies 14 and the second neutral bar assemblies 102 are electrically isolated by removing the field-removable jumper 104 (FIG. 3), one of the circuit breakers 114,112 can switch one of the first neutral 141 and the second neutral 143, respectively, to the second neutral bar assemblies 102.

Although the circuit breakers 112,114 are shown including three example poles (e.g., A,B,N), the disclosed concept is applicable to any suitable number of poles (e.g., without limitation, four poles; A,B,C,N).

Although the example portable generator 48" is shown, any suitable second power source, different from the first power source 26' (FIG. 3) (shown in phantom line drawing) can be employed.

The example three-pole generator circuit breaker 112 is connected in a backfeed arrangement as follows: generator A,B,N to load-side A,B,N, respectively; line-side A,B to second bus 132 A,B, respectively; and line-side N pigtail 136 to the lower left (with respect to FIG. 6) neutral bus bar assembly 102.

The three-pole utility circuit breaker 114 is connected in a backfeed arrangement as follows: utility A,B (from the first bus 128 utility circuit breaker 41' A,B) to load-side A,B, respectively; utility N (from neutral bus bar assembly 14) to the load-side N; line-side A,B to second bus 132 A,B, respectively; and line-side N pigtail 138 to the lower right (with respect to FIG. 6) neutral bus bar assembly 102.

Since the two example neutral bus bar assemblies 102 are electrically connected together by the fixed, rigid, conductive strap 140, both of the example neutral bus bar assemblies 102 provide termination points for the neutrals of critical loads (not shown).

Example 3

The conversion kit of Example 1 can alternatively include another two-pole utility circuit breaker (not shown) of suitable rating and a corresponding hold down kit (not shown), since there is no need to switch the generator neutral leg of a non-separately derived system.

Example 4

The example conversion kits of Examples 1 to 3 cover "manual" (portable generator) interlock setups. Additional example conversion kits, without interlocks, can be provided for users that wish to use an automatic transfer switch, such as 38 (shown in phantom line drawing in FIG. 3; see the ATS 38 of FIG. 1). It will be appreciated that the load center 100 (FIG. 3) can be converted for such a system in a similar manner.

Example 5

The example conversion kits of Examples 1 to 4 can cover a wide range of different amperages to accommodate a corresponding generator of suitable rating that the user wishes to use.

As can be seen from Examples 1 to 5, the example load center 100 (FIG. 3) can work with any suitable generator and any system setup, and can be field-converted, at a later date, from any one style to any other style with changes to a different user (e.g., without limitation, a different homeowner), or with changes to user requirements, priorities or power budget finances.

Example 6

FIGS. 5 and 6 show two branch circuit breakers 108,42' and 112,114, respectively, across from each other, which function with the example interlock 134 of FIG. 4. If the user (e.g., without limitation, contractor; homeowner) desires to provide a portable generator (e.g., without limitation, 48'), at a later date, then a suitable manual conversion kit is employed to convert the load center 100. This manual conversion kit includes the trim assembly 106 of FIG. 4 including a deadfront 142, along with the appropriate generator circuit breaker (e.g., 108 of FIG. 5) and a suitable hold down kit (e.g., 110 of FIG. 5). The trim assembly 106 also includes a number of twistouts 144 structured to accommodate at least one of the branch circuit breakers.

Per UL 67 and NEC, whenever a branch mounted circuit breaker, such as the example generator circuit breaker 108 or the example utility circuit breaker 42' of FIG. 5, is "backfed", it must be physically retained by something "other than friction" and must require a "tool" to remove. A wide range of suitable brackets, clips, screws and other hold down devices can be employed. The particular type of hold down device depends upon the type of branch circuit breaker and its particular application. With this manual conversion kit, the user can then use any suitable portable generator.

The mechanical interlock 134 on the trim assembly 106 of FIG. 4 prevents energizing both the "critical" and "non-critical" loads simultaneously. The mechanical interlock 134 is used to prevent both of the example utility circuit breaker 42' and the example generator circuit breaker 108 from being on simultaneously.

The load center 100 (FIG. 3) leaves the user with the option for either a "separately derived" system (FIG. 6) or a "non-separately derived" system (FIG. 5). Furthermore, at a still future date, the load center 100 can still accommodate an automatic transfer switch, such as 38 (shown in phantom line drawing in FIG. 3; see the ATS 38 of FIG. 1).

Example 7

FIGS. 5 and 6 show corresponding utility and generator circuit breakers 108,42' and 112,114, respectively, installed and their respective wiring for "non-separately derived" and "separately derived" systems. The installation of different conversion kits for a manual transfer arrangement in the load centers 100',100" permits the user to have the option of installing a relatively less costly portable generator, such as 48'. These conversion kits include the mechanical interlock 134 of FIG. 4 and permit the user to have the options of installing either a "non-separately derived" system (FIG. 5) or a "separately derived" system (FIG. 6).

Example 8

As shown in FIGS. 4-6, the example trim assembly 106 and interlock 134 permit interlocking for the "non-separately derived" system (FIG. 5) or the "separately derived" system (FIG. 6), and can be used when the user (e.g., without limitation, contractor; homeowner) considers the possibility of adding an automatic transfer switch, a corresponding wire harness and an automatic, standby generator at a later date.

Example 9

The disclosed load center 100 can be field-converted to accept either: (1) an automatic transfer switch (ATS), such as 38 (shown in phantom line drawing in FIG. 3), and an automatic, standby generator 48''' (shown in phantom line drawing in FIG. 3; see the ATS 38 and the second power source 48 of FIG. 1), or (2) a manual switch 146 formed by the example circuit breakers 108,42' (FIG. 5) and interlock 134 (FIG. 4) and a portable generator 48'. Also, conversion kits can be installed to provide either "non-separately derived" (FIG. 5) or "separately derived" (FIG. 6) systems simply by using a different conversion kit.

Example 10

The first power input 25' of FIG. 3 is structured to receive a primary power source, such as 26', and the second power input 47' (FIG. 5) is structured to receive a backup power source, such as 48'.

Example 11

The primary power source 26' is a utility power source, and the backup power source 48' is one of a portable generator, another generator different from the portable generator, an auxiliary power unit, and an uninterruptible power source.

Example 12

The loads (not shown) powered from the second bus 132 are critical loads selected from the group consisting of a heating, ventilation and air conditioning load; a sump pump; a refrigerator; a freezer; an alarm system; and a medical device.

Example 13

The first power input 25' and the second power input 47' both include a first power leg (A) structured to receive a first power phase and a second power leg (B) structured to receive an opposite second power phase.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An electrical distribution panel comprising:
   an enclosure;
   a first power input;
   a first circuit interrupter including a first terminal electrically connected to the first power input and a second terminal;
   a first bus electrically connected to the second terminal of the first circuit interrupter;
   a plurality of second circuit interrupters powered from the first bus;
   a second bus electrically connectable to the first bus through one of the plurality of second circuit interrupters; and
   a number of third circuit interrupters powered from the second bus,
   wherein the first bus and a number of the plurality of second circuit interrupters are structured to power a number of first loads,
   wherein the second bus and the number of third circuit interrupters are structured to power a number of second loads, which are different than the number of first loads,
   wherein the number of the plurality of second circuit interrupters operate independently from the number of third circuit interrupters,
   wherein the electrical distribution panel is structured to be converted for operation with a second power input to power the second bus, and
   wherein the second power input is structured to receive power from a separately derived system.

2. The electrical distribution panel of claim 1 wherein the enclosure includes a number of first neutral bar assemblies and a number of second neutral bar assemblies, the number of first neutral bar assemblies and the number of second neutral bar assemblies being electrically connected together by a field-removable jumper.

3. The electrical distribution panel of claim 2 wherein the second bus is structured to receive a first circuit breaker including a plurality of first poles with one of the first poles being structured to switch a first neutral, and a second circuit breaker including a plurality of second poles with one of the second poles being structured to switch a second neutral; wherein the first neutral is electrically connected to the number of first neutral bar assemblies and is operatively associated with the first bus and the first power input; wherein the second neutral is operatively associated with the second power input; and wherein after the number of first neutral bar assemblies and the number of second neutral bar assemblies are electrically isolated by removing the field-removable jumper, one of the first circuit breaker and the second circuit breaker switches one of the first neutral and the second neutral, respectively, to the number of second neutral bar assemblies.

4. The electrical distribution panel of claim 3 wherein the plurality of first poles and the plurality of second poles is at least three poles.

5. The electrical distribution panel of claim 3 wherein the plurality of first poles and the plurality of second poles is three poles.

6. An electrical distribution panel comprising:
   an enclosure;
   a first power input;
   a first circuit interrupter including a first terminal electrically connected to the first power input and a second terminal;
   a first bus electrically connected to the second terminal of the first circuit interrupter;
   a plurality of second circuit interrupters powered from the first bus;
   a second bus electrically connectable to the first bus through one of the plurality of second circuit interrupters; and
   a number of third circuit interrupters powered from the second bus,
   wherein the first bus and a number of the plurality of second circuit interrupters are structured to power a number of first loads,
   wherein the second bus and the number of third circuit interrupters are structured to power a number of second loads, which are different than the number of first loads,
   wherein the number of the plurality of second circuit interrupters operate independently from the number of third circuit interrupters,
   wherein the electrical distribution panel is structured to be converted for operation with a second power input to power the second bus,
   wherein the second power input is structured to receive power from a portable generator,
   wherein the electrical distribution panel is structured to be converted for operation with the portable generator,
   wherein the second bus is structured to receive a first circuit breaker and a second circuit breaker; wherein the first circuit breaker is structured to selectively receive power directly from the portable generator; and wherein the second circuit breaker is structured to selectively receive power from the one of the plurality of second circuit interrupters powered from the first bus.

7. The electrical distribution panel of claim 6 wherein the electrical distribution panel is further structured to be converted for operation with a separately derived system.

8. The electrical distribution panel of claim 6 wherein the first circuit breaker and the second circuit breaker are both two-pole circuit breakers.

9. The electrical distribution panel of claim 6 wherein the enclosure is structured to receive a trim assembly including a mechanical interlock structured to prevent both of the first circuit breaker and the second circuit breaker from being simultaneously closed.

10. The electrical distribution panel of claim 9 wherein the trim assembly further includes a number of twistouts structured to accommodate at least one of the first circuit breaker and the second circuit breaker.

11. The electrical distribution panel of claim 1 wherein the second bus is structured to receive a fourth circuit interrupter and a fifth circuit interrupter; wherein the fourth circuit interrupter is structured to selectively receive power from the portable generator; wherein the fifth circuit interrupter is structured to selectively receive power from the one of the plurality of second circuit interrupters powered from the first bus; and wherein the enclosure is structured to receive a trim assembly including a mechanical interlock structured to prevent both of the fourth circuit interrupter and the fifth circuit interrupter from being simultaneously closed.

12. The electrical distribution panel of claim 1 wherein the electrical distribution panel is further structured to be converted for operation with a non-separately derived system.

13. The electrical distribution panel of claim 1 wherein the electrical distribution panel is further structured to be converted for operation with an automatic transfer switch and an automatic, standby generator.

14. The electrical distribution panel of claim 1 wherein the first power input is structured to receive a primary power source; and wherein the second power input is structured to receive a backup power source.

15. The electrical distribution panel of claim 14 wherein the primary power source is a utility power source; and wherein the backup power source is one of the portable generator, another generator different from the portable generator, an auxiliary power unit, and an uninterruptible power source.

16. The electrical distribution panel of claim 1 wherein the second loads are critical loads selected from the group consisting of a heating, ventilation and air conditioning load; a sump pump; a refrigerator; a freezer; an alarm system; and a medical device.

17. The electrical distribution panel of claim 1 wherein the first power input and the second power input both include a first power leg structured to receive a first power phase and a second power leg structured to receive an opposite second power phase.

* * * * *